United States Patent
Crookston

(10) Patent No.: US 6,966,418 B2
(45) Date of Patent: Nov. 22, 2005

(54) EXTENSION FOR ROOF CONVEYOR

(76) Inventor: Anthony J. Crookston, 250 S. Van Buren Ave., Barberton, OH (US) 44203

( * ) Notice: Subject to any disclaimer, the term of this patent is extended or adjusted under 35 U.S.C. 154(b) by 1 day.

(21) Appl. No.: 10/713,814

(22) Filed: Nov. 14, 2003

(65) Prior Publication Data
US 2005/0103596 A1 May 19, 2005

(51) Int. Cl.[7] .................. B65G 21/10; B65G 41/00; B65G 15/26; B65G 17/28; B65G 21/14
(52) U.S. Cl. .................. 198/312; 198/313; 198/315; 198/316.1; 414/10
(58) Field of Search .................. 198/312, 313, 198/315, 316.1, 346, 316, 1; 414/10, 508, 414/523

(56) References Cited

U.S. PATENT DOCUMENTS

| | | | |
|---|---|---|---|
| 1,015,939 A * | 1/1912 | Brunelle | 198/313 |
| 2,708,998 A * | 5/1955 | Ulinski | 198/316.1 |
| 2,967,602 A | 1/1961 | Mosier | |
| 3,051,295 A | 8/1962 | Moy | |
| 3,088,609 A * | 5/1963 | Franzen | 414/508 |
| 3,204,788 A | 9/1965 | Kleinsorge | |
| 3,227,296 A * | 1/1966 | Marks | 414/508 |
| 3,244,299 A * | 4/1966 | Girardi | 414/523 |
| 3,454,173 A | 7/1969 | Martin | |
| 3,523,404 A * | 8/1970 | Girardi | 414/508 |
| 3,825,107 A | 7/1974 | Cary et al. | |
| 4,074,802 A | 2/1978 | Hudis | |
| 4,366,900 A | 1/1983 | Johannsson | |
| 5,669,562 A | 9/1997 | Smith | |
| 5,685,687 A | 11/1997 | Frye | |
| 6,447,234 B2 * | 9/2002 | Sinn et al. | 198/313 |

* cited by examiner

Primary Examiner—Gene O. Crawford
(74) Attorney, Agent, or Firm—Hahn, Loeser & Parks LLP

(57) ABSTRACT

A conveyor for transporting materials from a first location to a second location has an elongated boom having a first end, a second end, a top surface, and a bottom surface; a conveyor mechanism such as an endless belt or chain that is operably attached to the elongated boom; and a plank platform operably attached to the boom adjacent to the bottom surface of the boom, wherein the platform is selectively pivotable from the boom and capable of providing a walking surface for the person unloading the conveyor. The platform may additionally or alternatively be at least partially extendible from one end of the elongated boom. The conveyor may be operably attached to a vehicle.

21 Claims, 8 Drawing Sheets

EXTENSION FOR ROOF CONVEYOR

The present invention relates generally to conveyors. More particularly, the present invention relates to platform extensions for conveyors that extend and/or rotate from an end of the conveyor and aid the person unloading the conveyor.

BACKGROUND OF THE INVENTION

Many types of conveyors are widely known in the art. Conveyors typically comprise a fixed or articulated frame member, or boom, with an endless conveyor belt or chain located about the boom. Conveyors are generally used to transport materials, such as bundles of shingles and other roofing materials from, i.e., a truck to a roof top. Another form of conveyor system that may be utilized in conjunction with the present invention is a latter truck, such as the latter trucks used by fire departments.

One inherent problem with conveyors involves the angle of the conveyor in relation to an upper surface, such as a roof. This problem is especially evident when transporting, e.g., shingles onto a residential housing roof or other pitched surface. Since the conveyor is angled upwardly when transporting materials, the end of the conveyor may be vertically-spaced from the roof surface. As such, the person unloading the conveyor may have to reach above his or her head to receive the materials carried by the conveyor. Additionally, pitched roofs render a person's footing unsafe, especially when removing heavy items from the conveyor.

There is a need for a conveyor that provides a more level and safer approach angle for the person unloading materials from the conveyor. Accordingly, the present invention is hereby submitted.

SUMMARY OF THE INVENTION

One advantage of the present invention is realized by providing a conveyor having a platform or plank extendible from one end of the conveyor.

Another advantage of the present invention is realized by providing a conveyor having a platform or plank that is selectively rotatable or pivotable from the main boom of the conveyor.

These and other advantages of the present invention are realized by providing a conveyor for transporting materials from a first location to a second location that comprises an elongated boom having a first end, a second end, a top surface, and a bottom surface; a conveyor mechanism such as an endless belt or chain that is operably attached to the elongated boom; and a plank or platform operably attached to the boom adjacent to the bottom surface of the boom, wherein the platform is selectively pivotable from the boom and capable of providing a walking surface for the person unloading the conveyor. The platform may additionally or alternatively be at least partially extendible from one end of the elongated boom. The platform may be attached to a platform support, with the platform support being slidably or rollably attached to the elongated boom.

DETAILED DESCRIPTION OF THE INVENTION

Figure 1:
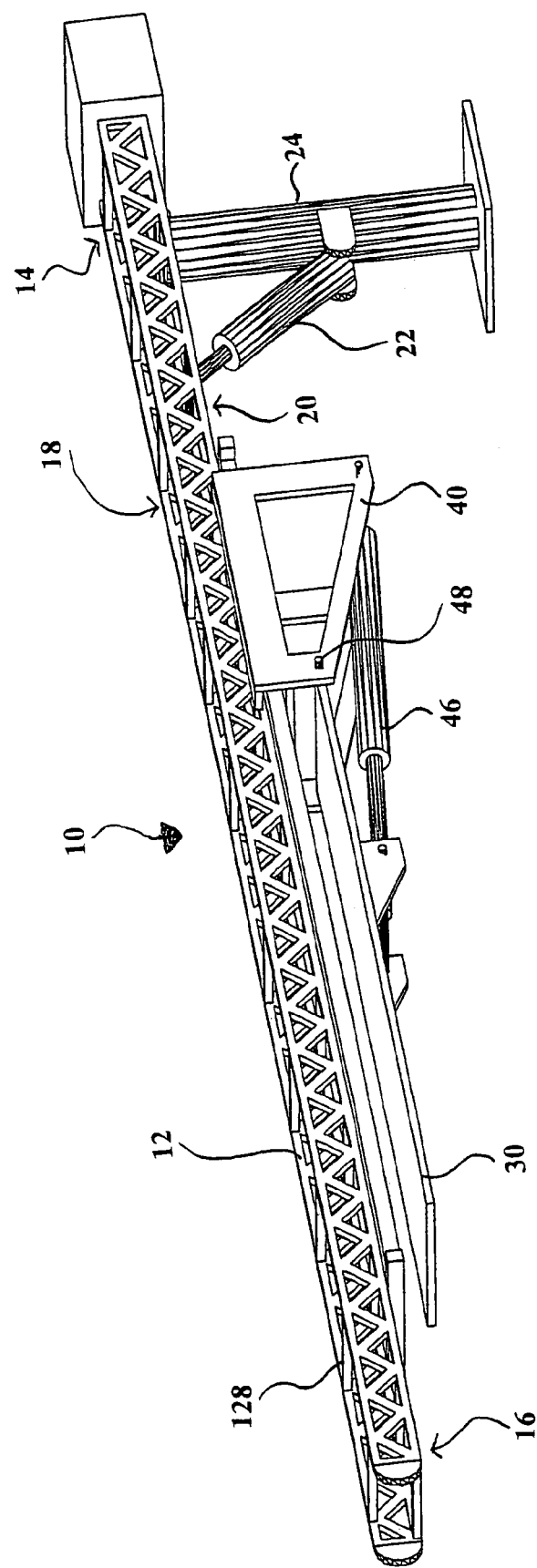
FIG. 1 is a perspective view of a conveyor with an extendible and pivotable platform, in accordance with a preferred embodiment of the present invention.

A preferred embodiment of a conveyor 10 is illustrated in FIG. 1. The conveyor 10 comprises a main boom 12 and conveyor mechanism 28, 128, such as a belt or chain. The main boom 12 comprises a first end 14 and a second end 16, and is attached to a base support. Preferably, the conveyor 10 comprises means for adjusting the pitch of the main boom 12 vertically and for translating the main boom 12 radially or horizontally. In a preferred embodiment, a rotatable pedestal 24 of a type known in the art is attached near the first end 14 to a base support. The rotatable pedestal 24 provides radial movement of the main boom 12. Rotatable pedestal 24 also preferably includes at least one hydraulic actuator 22 that facilitates movement of the main boom 12 vertically. As such, the main boom 12 is preferably adjustable both vertically and horizontally. The controls for the rotatable pedestal 24 and hydraulic actuator 22 are both of a type generally known in the art.

The main boom 12 additionally comprises upper or top surface 18 and lower or bottom surface 20. An endless conveyor mechanism 28, such as a belt, chain, or other structure known in the art may be operably attached to the main boom 12, such that materials to be transported are loaded onto the upper surface 18 of the main boom 12 near the first end 14. The materials are then conveyed toward the second end 16 of the main boom 12 and are unloaded accordingly. It is also contemplated that the main boom 12 may comprise a ladder device with rungs 128 in lieu of an endless conveyor mechanism 28.

Figure 2:
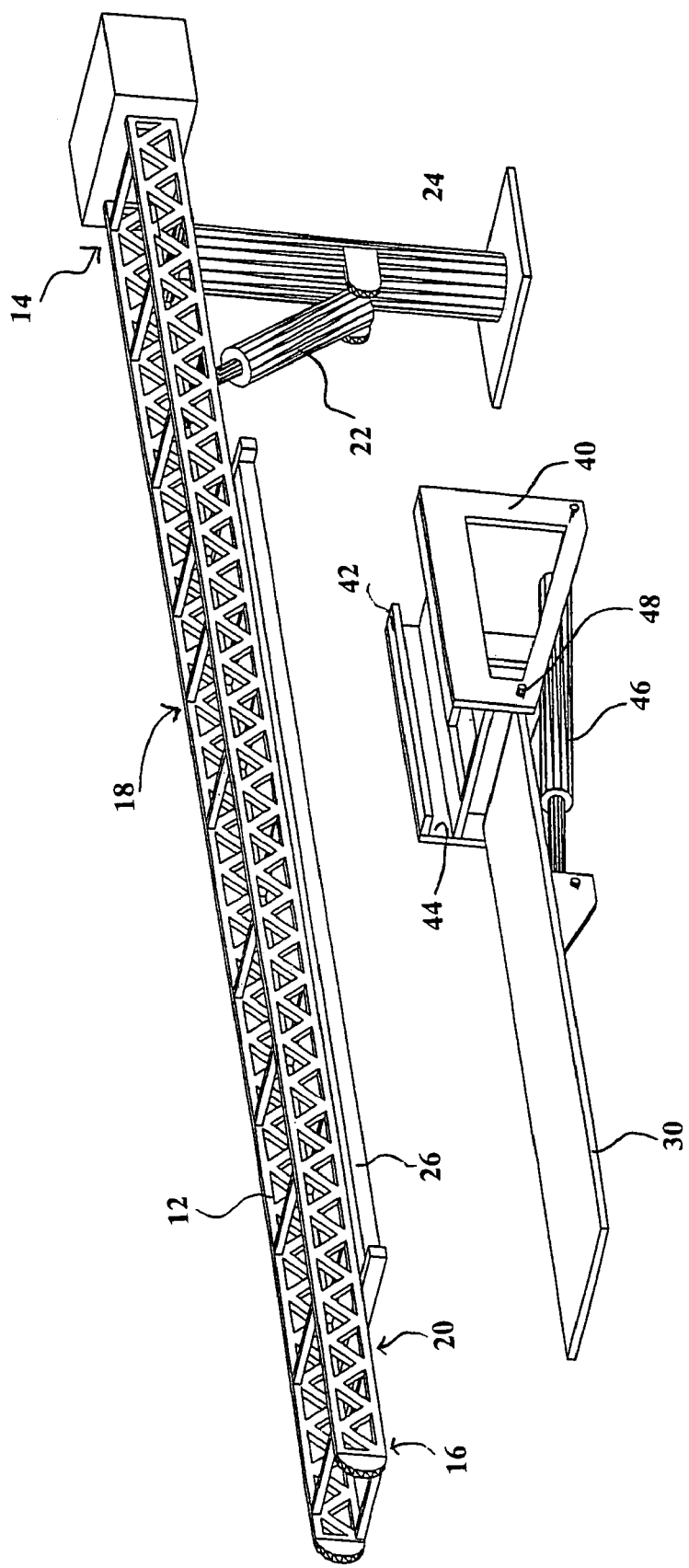
FIG. 2 is a perspective view of the conveyor of FIG. 1, shown with the platform and platform support detached from the boom
Figure 3:
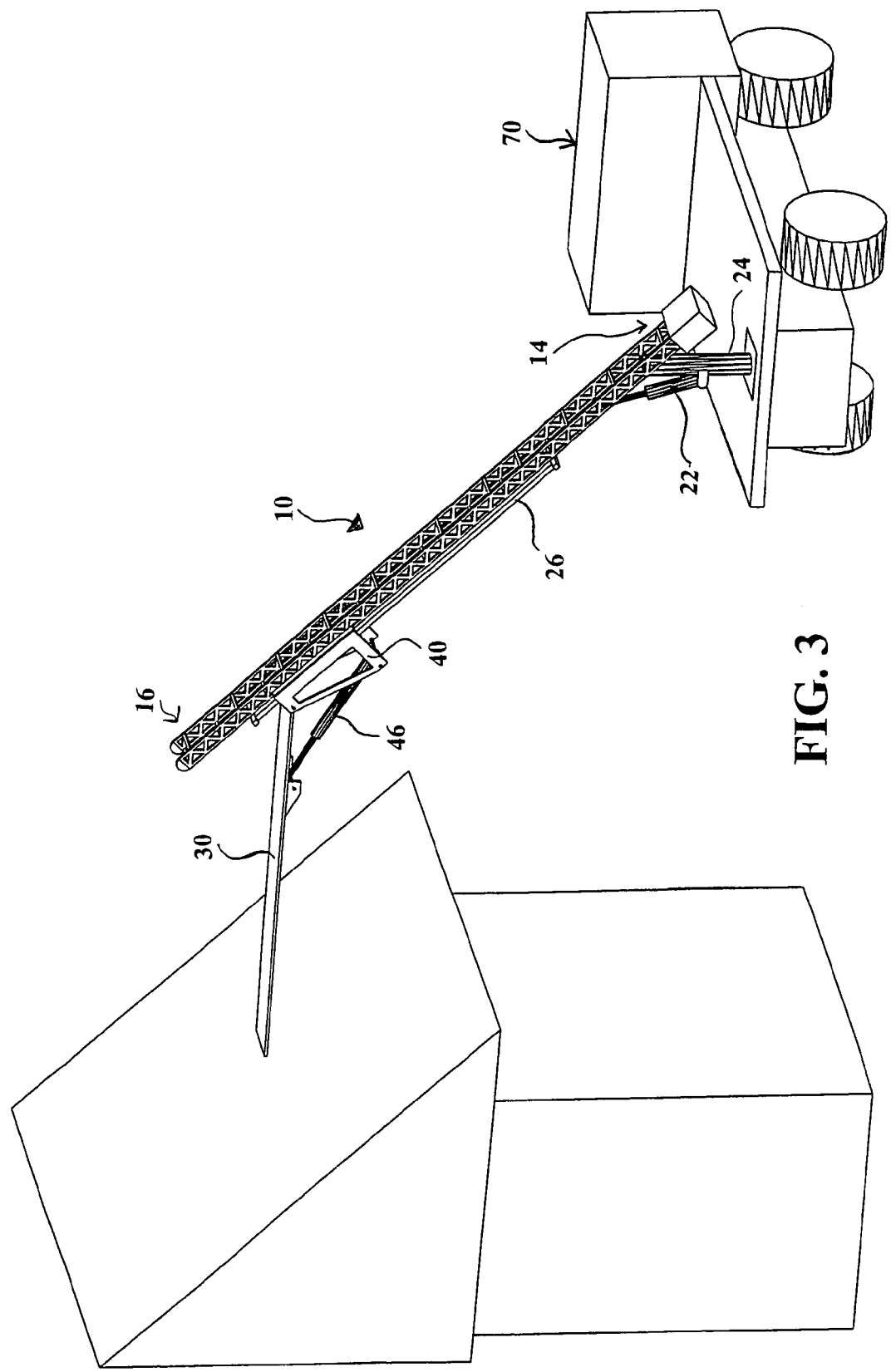
FIG. 3 is a perspective view of the conveyor of FIG. 1 attached to a vehicle and with the platform extended and pivoted downwardly.
Figure 4:
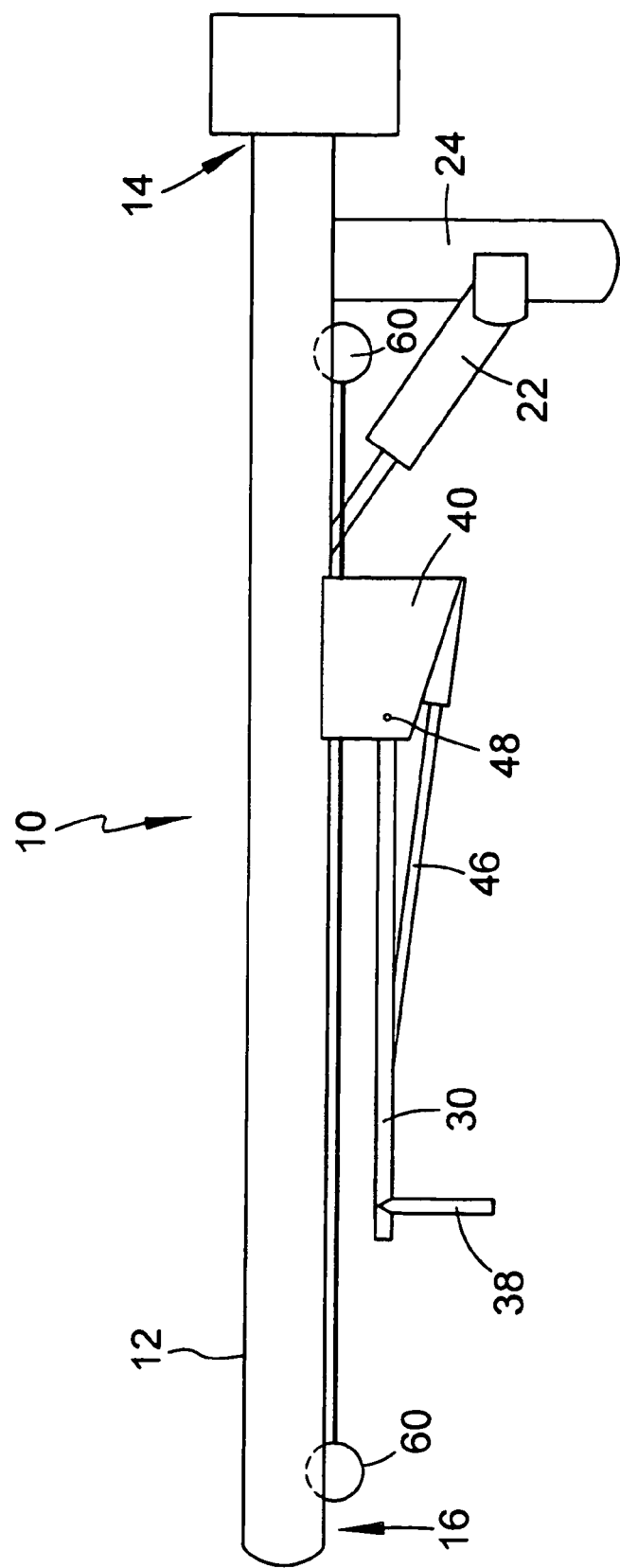
FIG. 4 is a side schematic view of the conveyor of FIG. 1.
Figure 5A:
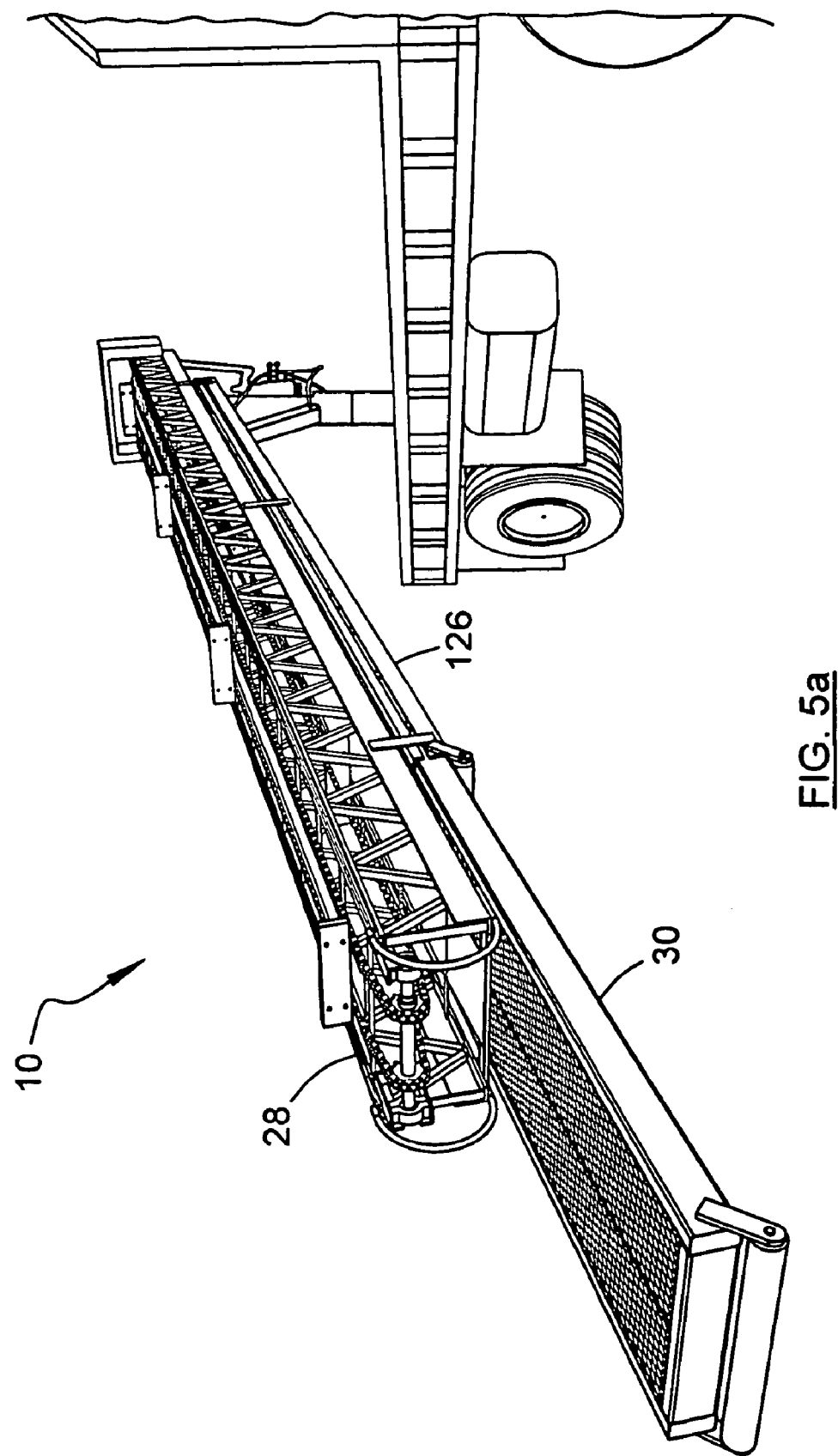
FIG. 5a is a perspective view of a second embodiment of a conveyor with a platform support track.
Figure 5B:
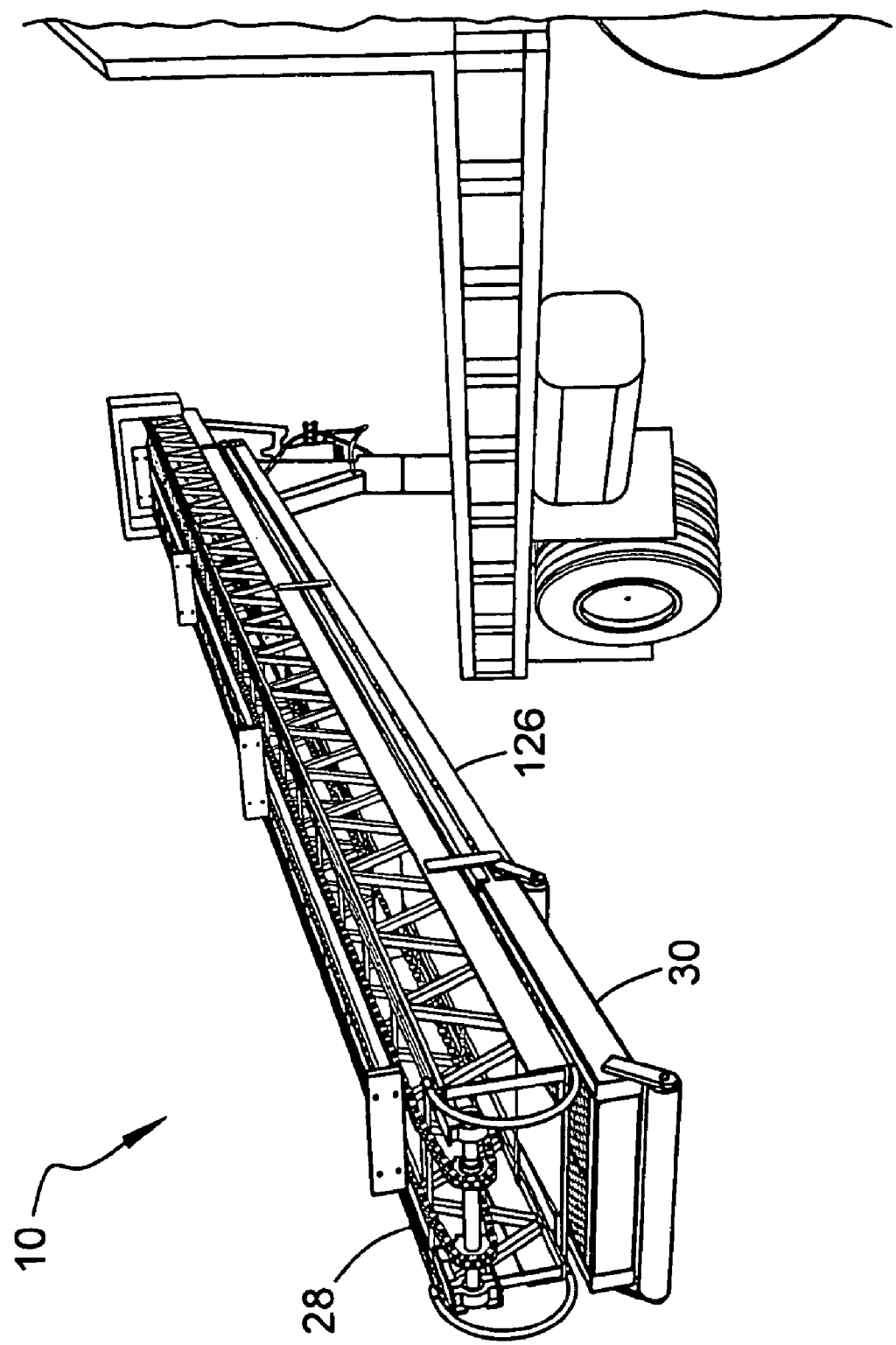
FIG. 5b is a perspective view of the conveyor of FIG. 5a, illustrated with the platform retracted.

Referring now to FIG. 2, the conveyor 10 further comprises platform 30, which may be extendable from the second end 16 and/or rotatable or pivotable downward from the main boom 12. Preferably, the platform 30 is of sufficient width to enable a person to walk across it. Additionally, the platform is preferably constructed of a rigid material such as steel or aluminum alloy, although any sufficiently rigid material can be utilized without deviating from the scope of the present invention.

The platform 30 is preferably pivotally attached at one end to a support means, which in FIG. 2 is illustrated as carriage 40. The carriage 40 is preferably rollably or slidably attached to the main boom 12. In a preferred embodiment, the carriage 40 comprises inwardly-projecting flanges 42 that forms slots 44. Slots 44 receive outwardly-projecting flanges 26 on main boom 12. In such an embodiment, carriage 40 is slidably attached to boom 12. Alternatively, a plurality of rollers could be utilized instead of flanges 26, without deviating from the scope of the present invention. It is also contemplated that the carriage 40 may be fixed in relation to the boom, with the platform 30 being telescopically extendable.

The platform 30 is preferably rotatably attached to carriage 40 at or near one end of the platform 30, such that the platform is selectively pivotable downward. As such, the user can position the platform 30 to provide a more level walking surface for the person or persons approaching the main boom 12 to unload materials from the conveyor 10. Any rotatable connection as is known in the art may be utilized. A preferred embodiment for the rotatable connection comprises pins or rods 48 that are received in apertures (not shown) in the carriage 40. To facilitate rotation of the platform 30, a hydraulic actuator 46 may by attached to the carriage 40 on one end and to the underside of the platform on the other end, as illustrated in FIG. 2. In such an embodiment, retraction of the hydraulic actuator 46 causes downward rotation of the platform 30. In the same manner, extension of the hydraulic actuator 46 causes the platform to rotate upwardly back to a position substantially parallel to main boom 12.

Figure 6:
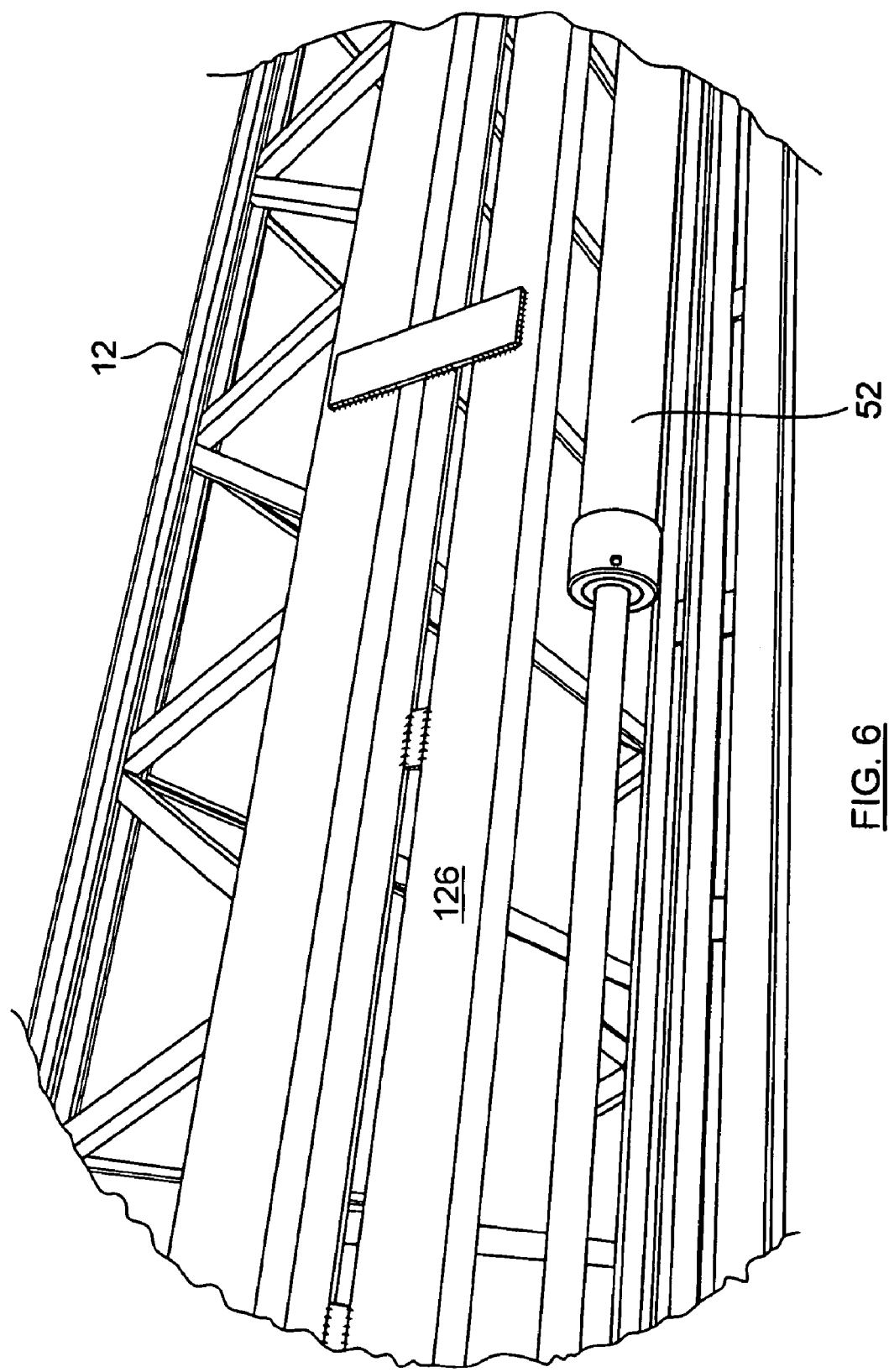
FIG. 6 is a close-up perspective view of a portion of the conveyor of FIG. 5a, showing the platform support track and a hydraulic cylinder for actuation of the platform.

Rather than carriage 40, it is also contemplated that the platform 30 may be slidably or rollably attached to the main boom by any suitable support means as is known in the art, without deviating from the scope of the present invention. For example, the platform 30 may be supported by cage or track 126 and slidably or rollably extendible and retractable from the cage or track 126. In such an embodiment, illustrated in FIG. 6, the platform 30 may be rotatably attached to a drive member 50, such that after a predetermined critical distance of extension, when the joint between the platform and the drive member approaches the end of the cage or track 126, the platform passively rotates downwardly.

Additionally, the platform 30 may be slidably or rollably attached to an elongated support means attached to the main boom 12, such that the platform 30 is extendible and retractable along the length of the support means but not rotatable in relation to the support means. In such an embodiment, the support means, itself may be rotatable downwardly to adjust the angle of the platform 30.

Figure 7:
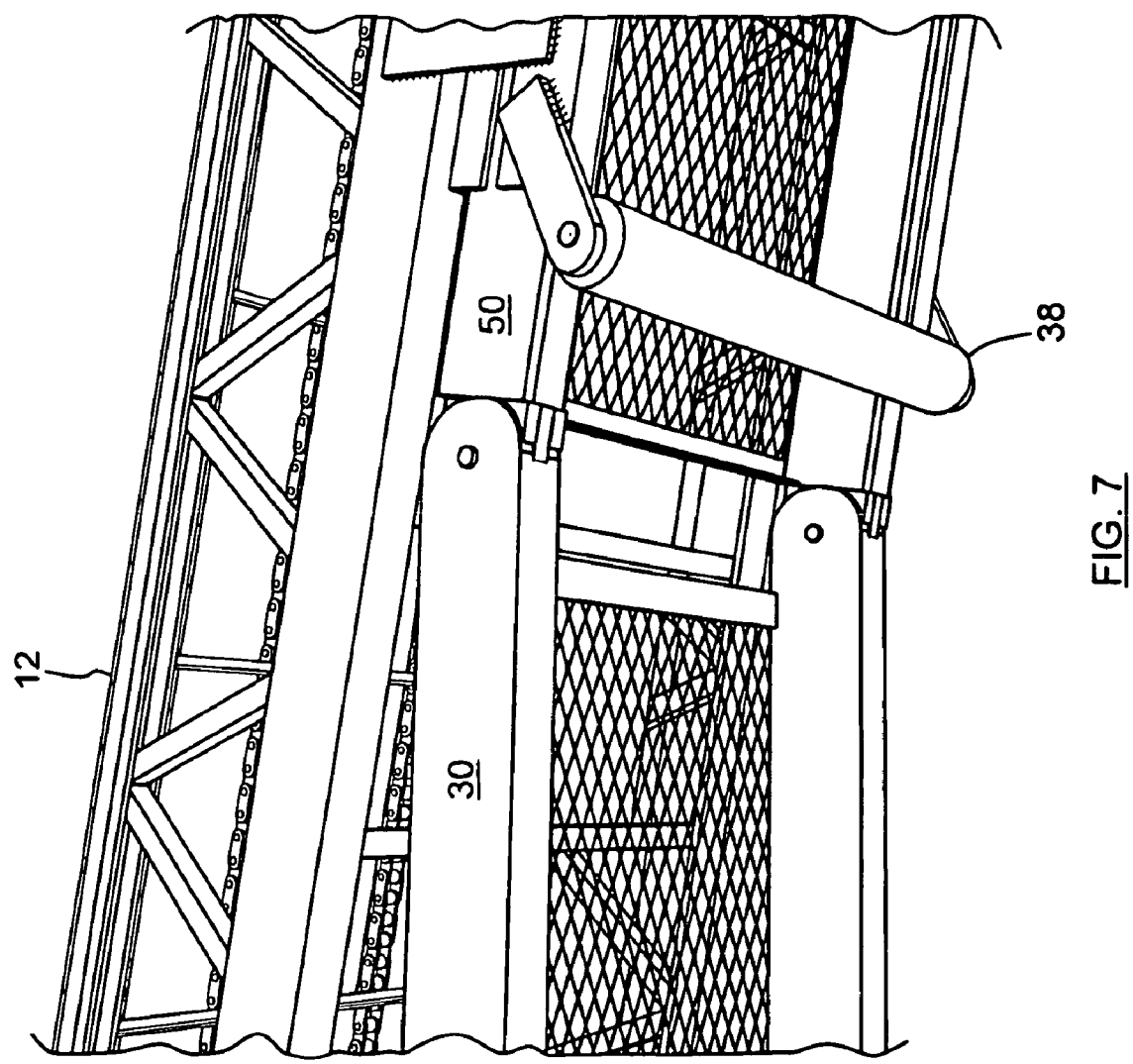
FIG. 7 is a close-up perspective view of a portion of the conveyor of FIG. 5a, showing a pivotable connection of the platform and a roller on the platform support track.

Extension and retraction of platform 30 is preferably hydraulically actuated. For example, carriage 40 may be translatable longitudinally in relation to the main boom 12 via opposing hydraulic winches 60 (FIG. 7) located at or near the ends of the main boom 12. To translate the platform 30, one winch 60 would wind its cable, while the opposing winch unwinds its cable. Alternatively, the hydraulic actuator may be a hydraulic cylinder 52 having its longitudinal axis substantially parallel to the main boom 12. Alternatively, extension and retraction of the platform 30 may be any other chain or winch drive as is known in the art. For example, opposing sides of the carriage 40 may be attached to chains or cables or the like. The chains or cables may additionally be attached to rotatable spools or drums, powered by any means known in the art, such that by winding the cable around one drum, while simultaneously unwinding the cable from the second drum translates the platform 30 forward or backward in relation to the main boom 12.

Optionally, platform 30 may further comprise at least one stabilizing member or leg 38. Stabilizing member 38 is preferably adjustable or rotatable downwardly in relation to platform 30. Optional stabilizing leg 38 may be used, for example, when only one side of the platform is touching a surface such as a roof.

In operation, the user first adjusts the elevation and direction of conveyor 10. The conveyor can either be fixed, manually moveable, or attached to a vehicle 70. After the elevation and direction of the conveyor 10 is selected, the user subsequently extends the platform 30 from the main boom 12 a predetermined distance, preferably via a hydraulic winch 60, hydraulic cylinder 52, or other chain or cable drive. After the platform 30 extends from the main boom 12 a predetermined distance, the user next rotates the platform 30 downwardly, with the end of the platform 30 resting on, if possible, a roof or other upper surface. It should be understood that if the platform 30 is extendible from a rotatable platform support, the user would rotate the platform support, itself, either before or after extension of the platform 30. Additionally, if the platform 30 is passively rotatable downwardly after extension a predetermined distance, the user only needs to extend the platform a predetermined distance to facilitate its rotation downwardly.

If the platform 30 is angled such that only one side of the platform 30 is touching the roof, optional support leg 38 can be engaged downwardly to ensure that both sides of the platform 30 are supported by the roof.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A conveyor system for transporting materials, the conveyor system comprising:
   an elongated boom having a first end, a second end, a top surface, and a bottom surface;
   a conveyor mechanism operably attached to the elongated boom; and,
   a platform adapted for a person to stand upon, the platform being operably attached to the boom by a support means, wherein the platform is adjustably mounted from a first position completely beneath the boom adjacent to the bottom surface and wherein the platform is selectively pivotable from the boom.

2. The conveyor system as recited in claim 1, wherein,
   the conveyor is adapted to convey materials from the first end of the boom to the second end of the boom,
   and the platform is at least partially extendible beyond the second end of the boom.

3. The conveyor system as recited in claim 1, wherein the conveyor system is attached to a vehicle.

4. The conveyor system as recited in claim 1, wherein the platform is adjacent to the bottom surface of the boom.

5. The conveyor system as recited in claim 1, wherein a means for pivoting the platform comprises a hydraulic actuator.

6. The conveyor system as recited in claim 5, wherein the hydraulic actuator comprises a hydraulic cylinder.

7. A conveyor system for transporting materials, the conveyor system comprising:
   an elongated boom having a first end, a second end, a top surface, and a bottom surface;
   a conveyor mechanism operably attached to the elongated boom; and,
   a platform operably attached to the boom by a support means, wherein the platform is selectively pivotable from the boom, and wherein the support means is selectively translatable between the first end of the boom and the second end of the boom.

8. The conveyor system as recited in claim 7, wherein a means for translating the support means comprises a hydraulic actuator.

9. The conveyor system as recited in claim 7, wherein a means for translating the support means comprises at least one hydraulic winch.

10. The conveyor system as recited in claim 7, wherein a means for translating said support means comprises a hydraulic cylinder.

11. A conveyor system for transporting materials, the conveyor system comprising:
   an elongated boom having a first end, a second end, a top surface, and a bottom surface;
   a conveyor mechanism operably attached to the elongated boom; and,
   a platform operably attached to the boom by a support means; wherein,
   the conveyor system is adapted to convey materials from the first end of the boom to the second end of the boom, and
   the platform is at least partially extendible beyond the second end of the boom and retractable to a position wholly between the first end of the boom and the second end of the boom.

12. The conveyor system as recited in claim 11, wherein the conveyor system is attached to a vehicle.

13. The conveyor system as recited in claim 11, wherein the platform is adjacent to the bottom surface of the boom.

14. The conveyor system as recited in claim 11, wherein the support means is selectively translatable between the first end of the boom and the second end of the boom.

15. The conveyor system as recited in claim 14, wherein a means for translating the support means comprises a hydraulic actuator.

16. The conveyor system as recited in claim 14, wherein the hydraulic actuator comprises a hydraulic winch.

17. The conveyor system as recited in claim 11, wherein the platform is slidably nestible within the platform support.

18. The conveyor system as recited in claim 17, wherein the support means further comprises at least one roller contacting the platform.

19. A conveyor system for transporting materials, the conveyor system having at least one elongated boom member and an endless conveyor mechanism operably attached the at least one boom member, the conveyor system comprising:
   a platform operably attached to the boom member by a support means, the platform being at least partially extendible beyond an end of the at least one boom member and selectively pivotable from the at least one boom member.

20. The conveyor system as recited in claim 19, wherein the conveyor system is attached to a vehicle.

21. The conveyor system as recited in claim 19, wherein the support means is translatable between a first end of the boom member and a second end of the boom member.

* * * * *